Figures 1, 2:
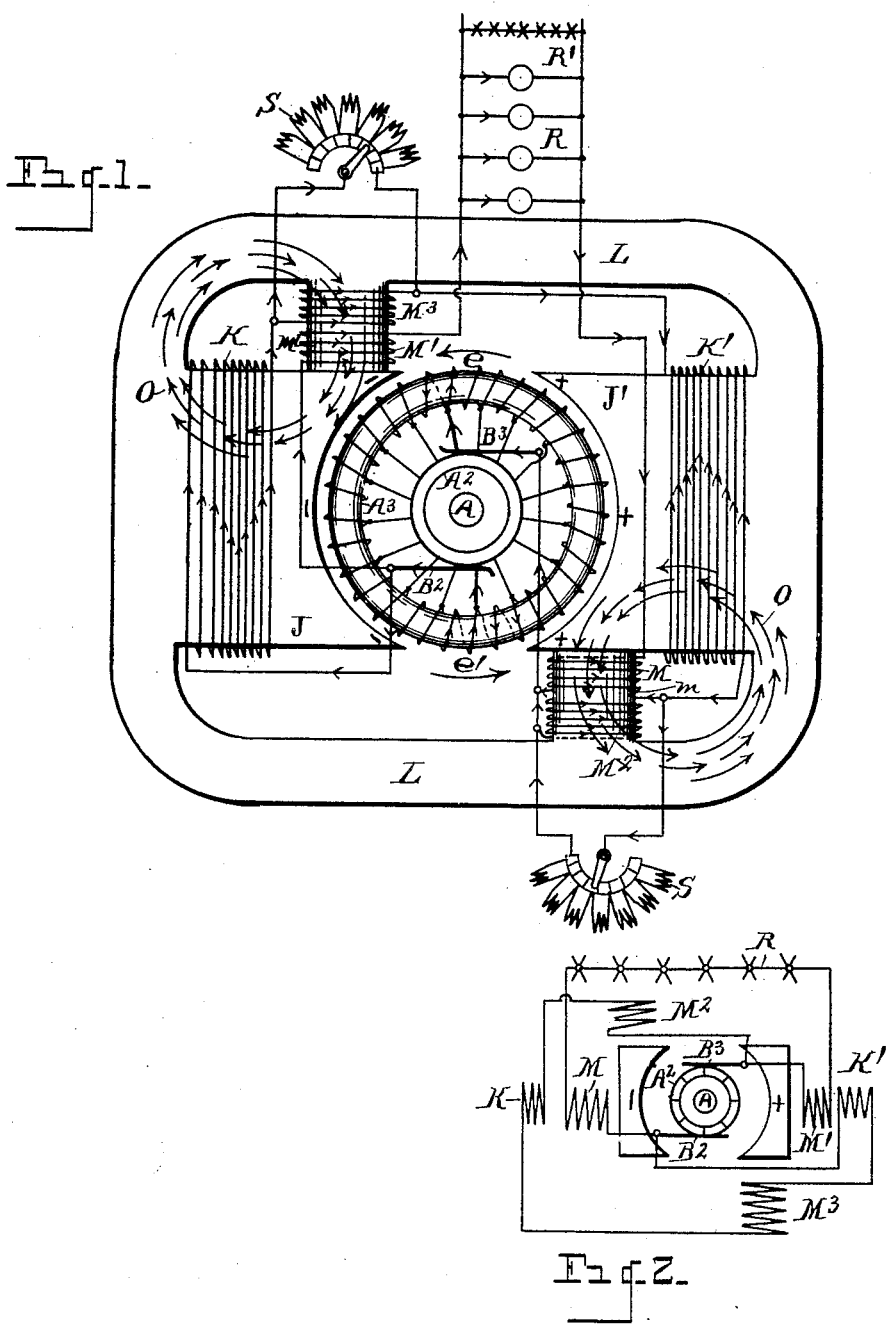

(No Model.)

T. H. HICKS.
CONSTRUCTION AND REGULATION OF ELECTRIC MACHINES.

No. 579,059. Patented Mar. 16, 1897.

WITNESSES
O. B. Baenziger
M. A. Martin

INVENTOR
Thomas H. Hicks
By his Attorney
Newell S. Wright

UNITED STATES PATENT OFFICE.

THOMAS H. HICKS, OF DETROIT, MICHIGAN.

CONSTRUCTION AND REGULATION OF ELECTRIC MACHINES.

SPECIFICATION forming part of Letters Patent No. 579,059, dated March 16, 1897.

Application filed February 23, 1895. Serial No. 539,506. (No model.)

*To all whom it may concern:*

Be it known that I, THOMAS H. HICKS, a subject of the Queen of Great Britain, residing at Detroit, county of Wayne, State of Michigan, have invented a certain new and useful Improvement in the Construction and Regulation of Electric Machines; and I declare the following to be a full, clear, and exact description of the invention, such as will enable others skilled in the art to which it appertains to make and use the same, reference being had to the accompanying drawings, which form a part of this specification.

This invention relates to new and useful improvements in the construction and regulation of electric machines, of which the following is a specification, and which can be readily understood by reference to the drawings hereto annexed.

My improvements refer to novel means for preventing sparking at the brushes of either a generator or motor when the load is varied and by the same means also effect automatic regulation suitable for either constant-potential or constant-current work-circuits.

Figure 1 is an end view of a Gramme-ring machine, showing more fully my scheme for preventing sparking at the brushes and effecting automatic regulation. Fig. 2 is a diagram view showing a modification of the field-magnet winding suitable for a constant-current work-circuit.

Figs. 1 and 2 are modifications of field-coil arrangements. In these figures, A is the shaft; $A^2$, a commutator; $A^3$, an armature. $B^2$ and $B^3$ are brushes. J and J' are field-magnet pole-pieces. L L are yokes. K K are shunt-coils. M M' are series supplemental coils, and $M^2$ and $M^3$ are shunt-coils wound upon the short-circuiting magnets $m$ $m'$. R is a series work-circuit.

In Fig. 1 I show the application of the short-circuiting magnets $m$ and $m'$ to a field of force in which is rotated a Gramme-ring armature.

When my regulating scheme is applied to a constant-current system where the voltage varies with the resistance of the work-circuit, the shunt field-magnet coils then become traversed with a current varying in volume. Therefore in such a case the short-circuiting magnets should be wound with coils $M^2$ $M^3$, which are connected in series with the main shunt-coils of the generator.

In Fig. 1 I show the short-circuiting magnets to be wound with both shunt-coils $M^2$ $M^3$ and with series coils M M'; but in Fig. 2 I only show the same magnets to be wound with shunt-coils, the series coils being arranged on the main field-magnets in the usual manner. It may thus be seen that I do not limit myself to only one coil on the short-circuiting magnet. So long as the volume of current is caused to vary in a coil which is wound upon the short-circuiting magnets $m$ $m'$ then my regulating scheme will be effective.

Having thus referred to the various parts of the construction, I will now explain the manner in which the short-circuiting magnets $m$ $m'$ are made effective in preventing sparking at the brushes and at the same time regulate the generator.

Suppose the short-circuiting magnets $m$ and $m'$ to be wound with series coils only. In such a case no current will flow through these series coils until work is turned on the work-circuit. Therefore magnetic lines of force will flow uninterruptedly through the magnets $m$ and $m'$, after the generator picks up, until current begins to flow through the series coils M and M', which are in series with the work-circuit. Thereafter the leaking lines of force will diminish proportional to the flow of current through the coils M and M', it being understood, of course, that the current which flows through these series coils tends to set up consequent poles between the magnets $m$ $m'$ and the pole-pieces to which they are joined, which I have indicated by plus and minus signs on the pole-pieces. This part of my scheme operates as follows: If the fall of potential in a separately-excited machine were ten per cent. at full load without using the series coils M M', then I would have the cross-section of the magnets $m$ $m'$ only sufficient to allow about five per cent. of the lines of force to leak through these magnets, and I would have the series coils M M' only contain a sufficient number of convolutions, so that when traversed by the current of the work-circuit at full load the ampere-turns of the series coils would just be sufficient to prevent magnetic leakage through the magnets $m$ $m'$. In this way as the load diminishes the magnetic leakage will increase in a manner which will be readily understood by electricians. It may be readily understood, then, that I effect regulation principally by causing magnetic leakage to decrease as the load on the machine increases and cause it to increase as the load on the machine decreases. Thus the increase and decrease of magnetic leakage always operate inversely to the increase and decrease of load on the machine.

The amount of wire required to be used in the series coils M M' when applied in the manner just described can be very much less than if the same coils were applied in the usual manner without the magnetic leakage. This is important, inasmuch as the resistance of a series coil arranged in the work-circuit causes the potential to drop proportionately as the number of translating devices is increased in the work-circuit, for if enough translating devices were to be turned on a multiple-arc work-circuit the resistance of the series coil would then equal the resistance of the work-circuit devices. If shunt-coils $M^2$ $M^3$ are used in addition to the series coils, then the cross-section of the magnets $m$ $m'$ can be increased accordingly, from the fact that the shunt-coils would stop the magnetic leakage proportional to the ampere-turns embodied in their arrangement. This part of my scheme, which refers to regulation by magnetic leakage, can be carried into effect independently of special location of the magnets $m$ $m'$ upon the pole-pieces, for if magnetic leakage occurs in any manner through a magnet then my scheme can be made effective; but to prevent sparking at the brushes during change of load these magnets $m$ $m'$ must be suitably located upon the pole-pieces of the field-magnets. I show the most suitable location in Fig. 1. I will now describe this part of my scheme. In generators as heretofore constructed, if the armature is operating as a generator, the brushes will require to be arranged so as to collect the current from the armature at points about equidistant from opposite lips of the pole-pieces when the armature is doing no other work than charging its fields, but in proportion as current is drawn from the armature the brushes require to be moved over the commutator in the direction of rotation of the armature, so as to prevent sparking on the commutator. The equidistant points referred to I have indicated at $e$ $e'$, Fig. 1. The cause of the sparking at the brushes is due to the current which is drawn from the armature demagnetizing the lip of each pole-piece toward which the armature is rotating. The effect of such demagnetization is equivalent to cutting off a portion of the demagnetized lip, which of course would leave the points of the armature where the current is being taken off unequal in distance from the two opposite polar lips. My present scheme, however, prevents these polar lips from becoming demagnetized, and consequently there will be no lead to the brushes during any variation of load on the generator. This I accomplish by a suitable location of the magnets $m$ $m'$ upon the field-magnet pole-pieces. The selected place for locating the magnets $m$ $m'$ must be upon the polar lips, toward which the armature approaches during rotation. The arrangement shown in Fig. 1 represents the proper location of the regulating-magnets, the armature being supposed to rotate to the left, as indicated by the arrows at $e$ and $e'$. The same location of the magnets will answer equally well to prevent sparking at the brushes if the machine be used as a motor and the armature rotates in an opposite direction, which would be to the right. In the case of a motor the armature-current demagnetizes the opposite polar lips, or those lips from which the armature is receding during rotation. My scheme is therefore equally useful for application to generators and motors. When the armature is doing no other work than supplying current to excite its fields, then the greatest magnetic leakage occurs. The effect of such leakage is to weaken this portion of the pole-piece. Consequently when the brushes are adjusted for a light load they will require to be moved farther around in the direction of rotation than if no magnetic leakage occurred. As the load is turned on the armature more current flows through the series coils M M', which proportionately stops the magnetic leakage and thereby strengthens the polar lips magnetically, which otherwise would become weaker with increase of load on the armature. By proper adjustment of the amount of magnetic leakage to the machine when running light, or through the series coil alone, sparking can be effectually prevented during all changes of load on the machine.

The resistances S (shown in Fig. 1) are for the purpose of adjusting the flow of current through the shunt-coils $M^2$ $M^3$ suitable for the desired amount of magnetic leakage.

Having thus described my invention, and in accordance therewith I claim as new and desire to secure by Letters Patent—

1. In an electric machine provided with field-magnets each having polar lips, the combination therewith of a short-circuiting magnet magnetically joined to only one polar lip of each field-magnet, substantially as described.

2. In an electric machine provided with a rotatable armature and field-magnets having polar lips at one end and two yokes L L joining the other ends of said magnets together, the combination therewith of short-circuiting electromagnets $m$ $m'$ magnetically joining only one polar lip of each field-magnet with one of said yokes for counteracting the demagnetizing power of said armature upon said polar lips to which the magnets $m\ m'$ are joined, substantially as described.

3. The combination in an electric machine of two field-magnets with two yokes L L and two short-circuiting electromagnets $m\ m'$, each of said field-magnets having two polar lips, the outer ends of said field-magnets being joined together by said two yokes L L, one of said short-circuiting magnets $m\ m'$ magnetically joining one polar lip of one field-magnet with one of said yokes and the other short-circuiting magnets magnetically joining one polar lip of the other field-magnet with the second yoke, substantially as described.

4. In an electric machine provided with field-magnets having polar lips, the combination therewith of short-circuiting magnets $m\ m'$ located upon only one polar lip of each field-magnet, said short-circuiting magnets $m\ m'$ being wound with coils of wire which are traversed by a current of electricity varying in volume, to counteract demagnetizing influences upon the polar lips upon which said short-circuiting magnets are located, substantially as described.

In testimony whereof I sign this specification in the presence of two witnesses.

THOMAS H. HICKS.

Witnesses:
 N. S. WRIGHT,
 M. A. MARTIN.